United States Patent
Gai et al.

(10) Patent No.: US 9,591,715 B2
(45) Date of Patent: Mar. 7, 2017

(54) OLED DRIVING COMPENSATION CIRCUIT AND DRIVING METHOD THEREOF

(71) Applicant: BOE TECHNOLOGY GROUP CO., LTD., Beijing (CN)

(72) Inventors: Cuili Gai, Beijing (CN); Danna Song, Beijing (CN); Qinghui Zeng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/803,387

(22) Filed: Jul. 20, 2015

(65) Prior Publication Data

US 2016/0286622 A1    Sep. 29, 2016

(30) Foreign Application Priority Data

Mar. 24, 2015 (CN) .......................... 2015 1 0130695

(51) Int. Cl.
 *H05B 33/08* (2006.01)
(52) U.S. Cl.
 CPC ................................ *H05B 33/0896* (2013.01)
(58) Field of Classification Search
 None
 See application file for complete search history.

(56) References Cited

U.S. PATENT DOCUMENTS

| | | | | |
|---|---|---|---|---|
| 9,153,172 B2* | 10/2015 | Nathan | ................ | G09G 3/3233 |
| 9,318,048 B2* | 4/2016 | Ma | ...................... | G09G 3/3233 |
| 2005/0052377 A1* | 3/2005 | Hsueh | ................. | G09G 3/3233 345/82 |
| 2009/0273591 A1* | 11/2009 | Jinta | .................... | G09G 3/3258 345/211 |
| 2009/0284503 A1* | 11/2009 | Jinta | .................... | G09G 3/3233 345/205 |
| 2010/0039458 A1* | 2/2010 | Nathan | ................ | G09G 3/3233 345/698 |
| 2010/0079430 A1* | 4/2010 | Yamashita | ........... | G09G 3/3233 345/210 |
| 2011/0080173 A1* | 4/2011 | Kim | ....................... | G09G 3/006 324/403 |
| 2011/0156611 A1* | 6/2011 | Tsai | ................... | H05B 33/0812 315/291 |

(Continued)

*Primary Examiner* — Crystal L Hammond
(74) *Attorney, Agent, or Firm* — Nath, Goldberg & Meyer; Joshua B. Goldberg

(57) ABSTRACT

An OLED driving compensation circuit and a driving method thereof are provided. The circuit comprises an external compensation module and a driving module comprising a driving transistor and a storage capacitor. The driving transistor is respectively connected with a power supply voltage terminal and an OLED via a first electrode and a second electrode thereof, a first terminal of the storage capacitor is connected with a control electrode of the driving transistor, and a second terminal thereof is connected between the driving transistor and the OLED. The external compensation module is connected between the driving transistor and the OLED and provides a reference voltage to the electrode of the driving transistor connected with the second terminal of the storage capacitor, to reset the voltage on the electrode. The power supply voltage terminal as variable voltage source inputs a first voltage equal to the reference voltage when the voltage is reset.

13 Claims, 3 Drawing Sheets

(56) References Cited

U.S. PATENT DOCUMENTS

| | | | |
|---|---|---|---|
| 2011/0164071 A1* | 7/2011 | Chung | G09G 3/3208 |
| | | | 345/690 |
| 2012/0146979 A1* | 6/2012 | Kim | G09G 3/3233 |
| | | | 345/211 |
| 2013/0069068 A1* | 3/2013 | Miyake | H01L 27/06 |
| | | | 257/59 |
| 2013/0241562 A1* | 9/2013 | Jin | G09G 3/006 |
| | | | 324/414 |
| 2014/0055325 A1* | 2/2014 | Qi | G09G 3/3233 |
| | | | 345/76 |
| 2014/0070725 A1* | 3/2014 | Qi | G09G 3/3233 |
| | | | 315/291 |
| 2014/0118420 A1* | 5/2014 | Ma | G09G 3/3233 |
| | | | 345/690 |
| 2014/0168038 A1* | 6/2014 | Kim | G09G 3/3208 |
| | | | 345/82 |
| 2014/0346968 A1* | 11/2014 | Meng | H05B 33/0896 |
| | | | 315/240 |
| 2015/0269885 A1* | 9/2015 | Ma | G09G 3/3233 |
| | | | 345/205 |

* cited by examiner

OLED DRIVING COMPENSATION CIRCUIT AND DRIVING METHOD THEREOF

FIELD OF THE INVENTION

The present invention relates to the field of display technology, and specifically relates to an OLED driving compensation circuit and a driving method thereof.

BACKGROUND OF THE INVENTION

In an AMOLED display device, the luminescence brightness of each OLED is determined by driving current generated by a driving circuit, and the driving current generated by the driving circuit can be expressed by the following formula:

$$I_{OLED} = K \cdot (V_{gs} - V_{th})^2,$$

wherein K is a parameter related with the process parameter and the feature size of a driving transistor, $V_{gs}$ is the voltage difference between the gate and the source or between the gate and the drain of the driving transistor (determined by the type of the driving transistor), and $V_{th}$ is the threshold voltage of the driving transistor.

When the AMOLED display device displays a frame of picture, the threshold voltage $V_{th}$ of the driving transistor may drift, and the driving current $I_{OLED}$ is changed, so that the luminescence brightness of the OLED is changed, to influence the display uniformity of single pixels in a frame of picture (particularly for an LTPS type display device). Moreover, the drift amplitudes of the threshold voltages of the driving transistors in different pixel units may be different under the action of long-time high temperature and high voltage, which leads to difference of display brightness, and such brightness difference is related with the image of the previous frame of picture, so that a "ghost" phenomenon is finally produced.

On the other hand, in the AMOLED display device, power supply lines inherently have certain resistance, so that a power supply voltage input to the pixel unit close to a power supply is relatively high, whereas the power supply voltage input to the pixel unit far from the power supply is relatively low, namely a so-called "voltage drop" (IR Drop) phenomenon appears. This phenomenon also influences the display uniformity of the pixel unit in each area of the AMOLED display device.

Moreover, in the evaporation process of fabricating process for the OLED device, the thickness of film formed by evaporation has certain differences among different OLED devices, and the non-uniformity of the film thickness in the OLED devices also influences the display uniformity of the pixel units.

SUMMARY OF THE INVENTION

The present invention aims to solve the above technical problems in the prior art and provide an OLED driving compensation circuit and a driving method thereof. Two electrodes of a driving transistor for generating driving current can be completely reset to respective initial voltage at a reset phase, so that a good compensation effect is obtained. Meanwhile, a width-length ratio of a transistor in an external compensation module can be further reduced, so that an aperture ratio of pixel units is improved and an area occupied by each pixel unit is reduced.

An embodiment of the present invention provides an OLED driving compensation circuit, including a driving module and an external compensation module. The driving module includes a driving transistor and a storage capacitor, a first electrode of the driving transistor is connected with a power supply voltage terminal, and a second electrode of the driving transistor is connected with an OLED, a first terminal of the storage capacitor is connected with a control electrode of the driving transistor, and a second terminal of the storage capacitor is connected between the driving transistor and the OLED. The external compensation module is connected between the driving transistor and the OLED, and is used for providing a reference voltage to the second terminal of the storage capacitor and the electrode of the driving transistor connected with the second terminal of the storage capacitor, so as to reset the voltage on the second terminal of the storage capacitor and the electrode of the driving transistor connected with the second terminal of the storage capacitor. The power supply voltage terminal is a variable voltage source, which inputs a first voltage when the external compensation module resets the voltage on the second terminal of the storage capacitor and the electrode of the driving transistor connected with the second terminal of the storage capacitor, the first voltage is equal to the reference voltage.

The driving module may further include a switching transistor, a control electrode of the switching transistor is connected with a gate line, a first electrode of the switching transistor is connected with a data line, a second electrode of the switching transistor is connected with the control electrode of the driving transistor and the first terminal of the storage capacitor, and the OLED is further connected with a low voltage terminal.

The external compensation module may include a third transistor and a reference voltage terminal. The control electrode of the third transistor is connected with a control signal terminal, a first electrode of the third transistor is connected between the driving transistor and the OLED, a second electrode of the third transistor is connected with the reference voltage terminal via a switch, and the reference voltage terminal is used for inputting the reference voltage.

The external compensation module may further include a voltage holding unit. The voltage holding unit is connected with the second electrode of the third transistor, and is used for holding the voltage on the electrode of the driving transistor connected with the second terminal of the storage capacitor.

The voltage holding unit may include at least one holding capacitor. One terminal of the holding capacitor is connected with the second electrode of the third transistor, and the other terminal of the holding capacitor is grounded.

The voltage holding unit may include two holding capacitors.

Each transistor may be an N-type transistor.

Another embodiment of the present invention further provides a driving method for the above OLED driving compensation circuit, including a reset step for resetting the voltages of the control electrode of the driving transistor and the electrode connected with the second terminal of the storage capacitor, the reset step includes inputting the reference voltage to the electrode of the driving transistor connected with the second terminal of the storage capacitor and inputting the first voltage to the electrode of the driving transistor connected with the power supply voltage terminal, the first voltage is equal to the reference voltage.

The driving method may further include: a charging step, for charging the storage capacitor, wherein the charging step includes inputting a second voltage to the electrode of the driving transistor connected with the power supply voltage terminal, the second voltage is higher than the first voltage; and a holding step, for holding the voltage on the second terminal of the storage capacitor and the voltage on the electrode of the driving transistor connected with the second terminal of the storage capacitor.

In the reset step, a high level signal is input to the gate line and the control signal terminal, and a first data signal is input to the data line, so that the driving transistor is turned on.

In the charging step, a low level signal is input to the gate line, a high level signal is input to the control signal terminal, the reference voltage is stopped from being input to the reference voltage terminal, and the power supply voltage terminal charges the storage capacitor and the voltage holding unit, the second voltage is a normal working voltage required for generating the driving current.

In the holding step, a high level signal is input to the gate line and the control signal terminal, a specific voltage is input to the data line, and the driving transistor is turned off by the specific voltage, so that the first terminal of the storage capacitor has the specific voltage, and the second terminal of the storage capacitor holds the voltage charged in the charging step under the action of the voltage holding unit.

In the OLED driving compensation circuit provided by the embodiment of the present invention, the external compensation module compensates the voltages of the control electrode of the driving transistor and the electrode of the driving transistor connected with the second terminal of the storage capacitor, to avoid that the threshold voltage of the driving transistor, the voltage drop on the power line and the non-uniformity of film thickness in the OLEDs influence the luminance uniformity of each OLED in a frame of picture and the luminance uniformity of the OLEDs. Moreover, at the reset phase of compensation, the first voltage input by the power supply voltage terminal is equal to the reference voltage, so that the voltage on the electrode of the driving transistor connected with the second terminal of the storage capacitor is completely equal to the reference voltage, and then a best reset effect is achieved. Meanwhile, it is not needed to require the resistance of the third transistor to be further lower than that of the driving transistor in order that the difference between the voltage on the electrode of the driving transistor connected with the second terminal of the storage capacitor and the reference voltage is as small as possible, so that large width-length ratio of the third transistor can be avoided, and the problems that the aperture ratio of pixel units is reduced and the area occupied by each pixel unit is enlarged are avoided.

In the driving method for the OLED driving compensation circuit provided by the present invention, when the voltages of the control electrode of the driving transistor and the electrode connected with the second terminal of the storage capacitor are reset, the first voltage equal to the reference voltage is input to the power supply voltage terminal, and the reference voltage is also input to the reference voltage terminal, so that the voltage on the electrode of the driving transistor connected with the second terminal of the storage capacitor is equal to the reference voltage, and then a best reset effect can be achieved. Meanwhile, it is not needed to require the resistance of the third transistor to be further lower than that of the driving transistor in order that the difference between the voltage on the electrode of the driving transistor connected with the second terminal of the storage capacitor and the reference voltage is as small as possible, so that large width-length ratio of the third transistor can be avoided, and the problems that the aperture ratio of pixel units is reduced and the area occupied by each pixel unit is enlarged are avoided.

BRIEF DESCRIPTION OF THE DRAWINGS

The accompanying drawings are used for providing further understanding of the present invention, constituting part of the specification and interpreting the present invention together with the specific embodiments below, rather than limiting the present invention. In the drawings.

DETAILED DESCRIPTION OF THE EMBODIMENTS

The specific embodiments of the present invention will be described in detail below in combination with the accompanying drawings. It should be understood that the specific embodiments described herein are merely used for describing and interpreting the present invention, rather than limiting the present invention.

Figure 1:
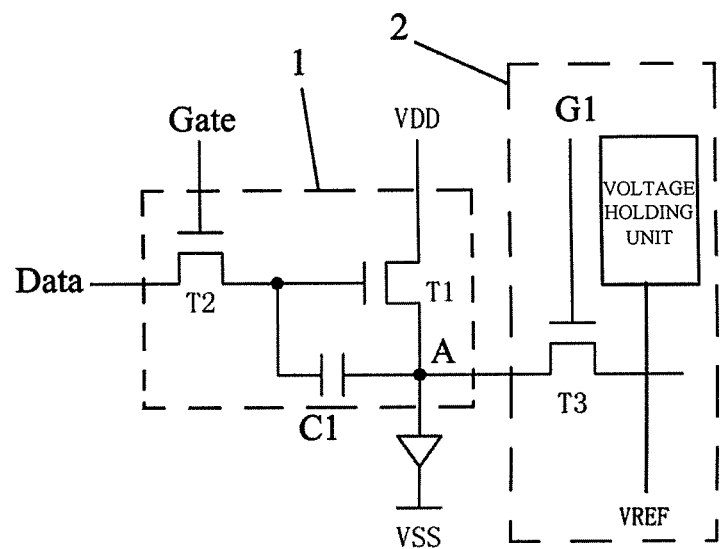
FIG. 1 is a schematic diagram of an OLED driving compensation circuit provided by an embodiment of the present invention.

FIG. 1 shows an OLED driving compensation circuit provided by an embodiment of the present invention. In this embodiment, the OLED driving compensation circuit includes a driving module 1 and an external compensation module 2. The driving module 1 includes a driving transistor T1 and a storage capacitor C1; a first electrode of the driving transistor T1 is connected with a power supply voltage terminal VDD, and a second electrode of the driving transistor T1 is connected with an OLED; a first terminal of the storage capacitor C1 is connected with the control electrode of the driving transistor T1, and a second terminal of the storage capacitor C1 is connected between the driving transistor T1 and the OLED. The external compensation module 2 is connected between the driving transistor T1 and the OLED, and is used for providing a reference voltage VREFL to the second terminal of the storage capacitor C1 and the electrode of the driving transistor T1 connected with the second terminal of the storage capacitor C1, so as to reset the voltage on the second terminal of the storage capacitor C1 and the electrode of the driving transistor T1 connected with the second terminal of the storage capacitor C1. The power supply, voltage terminal VDD is a variable voltage source, which inputs a first voltage VDD1 when the external compensation module 2 resets the voltage on the second terminal of the storage capacitor C1 and the electrode of the driving transistor T1 connected with the second terminal of the storage capacitor C1, the first voltage VDD1 is equal to the reference voltage VREFL.

In this embodiment, the control electrode of the above-mentioned driving transistor T1 and each transistor below indicates the gate thereof, and the first electrode and the second electrode respectively express the source and the drain thereof, specifically, the first electrode is the source and the second electrode is the drain, or the first electrode is the drain and the second electrode is the source.

In the driving module 1, driving current is generated according to the voltages on the gate of the driving transistor T1 and the electrode of the driving transistor T1 (for convenience of description, this electrode is called the drain below, and the electrode of the driving transistor T1 connected with the power supply voltage terminal VDD is called the source) connected with the second terminal of the storage capacitor C1, to drive the OLED to emit light. The external compensation module 2 is used for compensating the voltages of the gate and the drain of the driving transistor T1, so that the generated driving current is irrelevant with the threshold voltage of the driving transistor T1 and is not influenced by the voltage drop (IR Drop) on a power supply line or the non-uniformity of film thickness in the OLED of each pixel unit, and the change of the brightness of the OLED due to drift of the threshold voltage of the driving transistor T1 in the light emitting process of the OLED is avoided and the non-uniformity of the threshold voltages $V_{th}$ of the driving transistors T1 of different pixel units is further avoided, non-uniform light emission of the OLED in each pixel unit due to the non-uniformity of the OLED in each pixel unit is correspondingly avoided, the light emitting uniformity of the OLED in each pixel unit within a frame of time and the light emitting uniformity of the OLED in each pixel unit can be accordingly improved, and the display quality of the OLED display device is finally improved.

Specifically, to achieve the object of generating the current for driving the OLED to emit light, the driving module 1 may further include a switching transistor T2. A control electrode of the switching transistor T2 is connected with a gate line Gate, a first electrode (called the source below) of the switching transistor T2 is connected with a data line Data, and a second electrode (called the drain below) of the switching transistor T2 is connected with the control electrode of the driving transistor T1 and the first terminal of the storage capacitor C1. The OLED is further connected with a low voltage terminal VSS.

To achieve the object of compensating the voltages of the gate and the drain of the driving transistor T1, the external compensation module 2 may include a third transistor T3, a reference voltage terminal VREF and a voltage holding unit. A control electrode of the third transistor T3 is connected with a control signal terminal G1, a first electrode of the third transistor T3 is connected between the driving transistor T1 and the OLED, a second electrode of the third transistor T3 is connected with the reference voltage terminal VREF, and a switch (not shown in FIG. 1) is provided between the second electrode of the third transistor T3 and the reference voltage terminal VREF, so that the second electrode of the third transistor T3 may be connected with or disconnected from the reference voltage terminal VREF. The reference voltage terminal VREF is used for inputting the reference voltage VREFL. The voltage holding unit is connected with the second electrode of the third transistor T3, and is used for holding the voltage on the electrode of the driving transistor T1 connected with the second terminal of the storage capacitor C1. Specifically, the voltage holding unit includes at least one holding capacitor, one terminal of the holding capacitor is connected with the second electrode of the third transistor T3, and the other terminal of the holding capacitor is grounded. In this embodiment, the voltage holding unit may include two holding capacitors, namely $C_{sense}$ and $C_{icap}$ in FIGS. 3-5.

Figure 2:
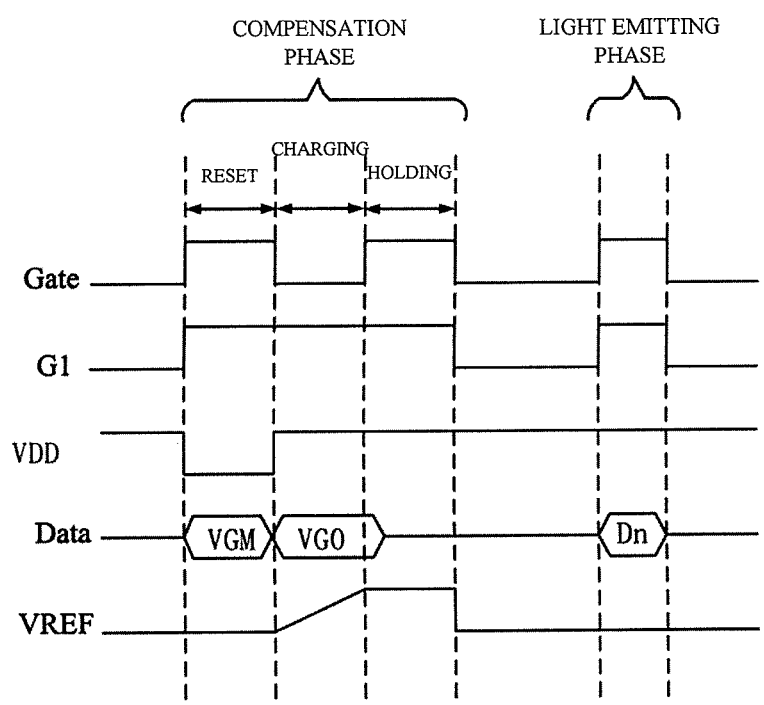
FIG. 2 is a timing diagram of each signal in the OLED driving compensation circuit.

In this embodiment, the driving transistor T1, the switching transistor T2 and the third transistor T3 may be N-type transistors. When each transistor is the N-type transistor, the timing of each signal input to the driving compensation circuit is as shown in FIG. 2. The principle and the process that the OLED driving compensation circuit provided by this embodiment compensates the driving transistor T1 and drives the OLED to emit light will be described in detail below in combination with the timing shown in FIG. 2, taking the OLED in the $n^{th}$ row and the $m^{th}$ column of pixel unit of an OLED display panel as an example.

Firstly, before the OLED is driven to emit light, the voltages of the gate and the drain of the driving transistor are compensated, and this step includes the following three phases.

Figure 3:
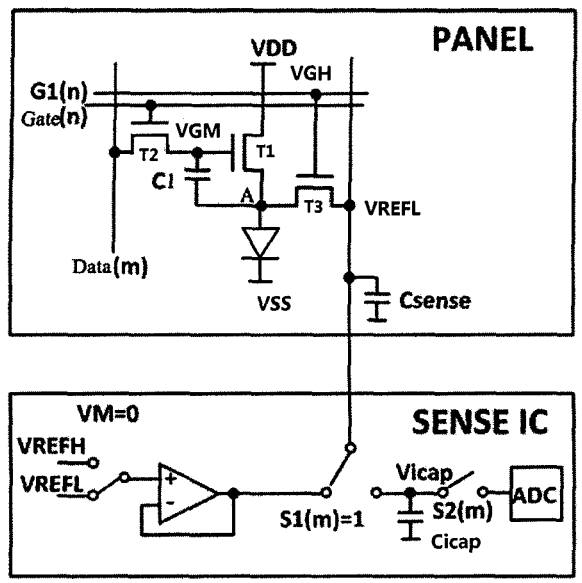
FIG. 3 is a schematic circuit diagram at a reset phase.

The first phase is a reset phase. In this phase, as shown in FIGS. 2 and 3, a high level signal is input to the gate line Gate, so that the switching transistor T2 is turned on; a specific voltage VGM is input to the data line Data, so that the driving transistor T1 is turned on; a high level signal is also input to the control signal terminal G1, so that the third transistor T3 is turned on; and the third transistor T3 is connected with the reference voltage terminal VREF. The power supply voltage terminal VDD provides a first voltage VDD1, and the reference voltage terminal provides a reference voltage VREFL. Under such a condition, the voltage on the gate of the driving transistor T1 and the first terminal of the storage capacitor C1 is reset as VGM, and the voltage on the drain of the driving transistor T1 and the second terminal of the storage capacitor C1, namely the voltage of point A in FIG. 1, is reset as:

$$V_A = \frac{R_{T3}}{(R_{T1} + R_{T3})} \times (VDD1 - VREFL) + VREFL,$$

wherein $R_{T1}$ and $R_{T3}$ respectively express the resistance values of the driving transistor T1 and the third transistor T3. In the reset step, the smaller the difference between the $V_A$ and the reference voltage VREFL is, the better the reset effect is, otherwise, the worse.

In this embodiment, the first voltage VDD1 is equal to the reference voltage VREFL, so that the voltage of the point A can be completely equal to the reference voltage VREFL, and then a best reset effect can be achieved. Meanwhile, it is not needed to require $R_{T1} \square R_{T3}$ in order that the difference between the voltage of the point A and the reference voltage VREFL is as small as possible, then large width-length ratio of the third transistor T3 can be avoided, influence on the aperture ratio of pixel units is avoided, and a large area occupied by each pixel unit is avoided.

Figure 4:
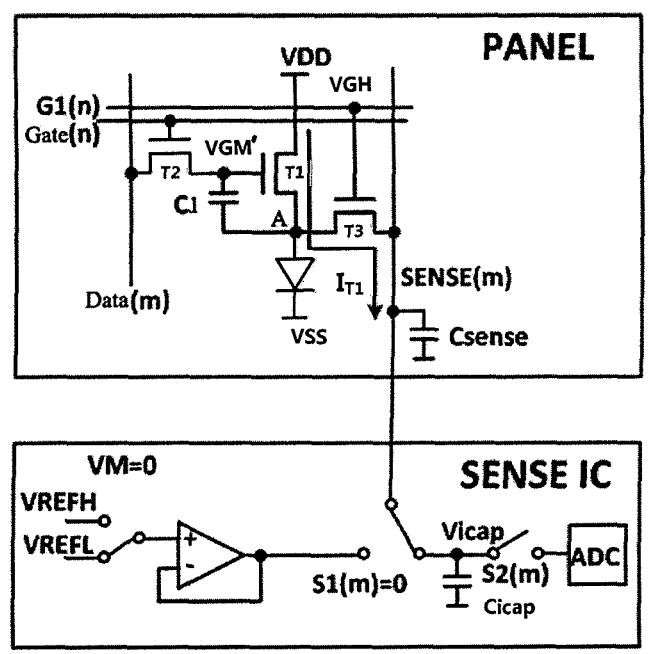
FIG. 4 is a schematic circuit diagram at a charging phase.
Figure 5:
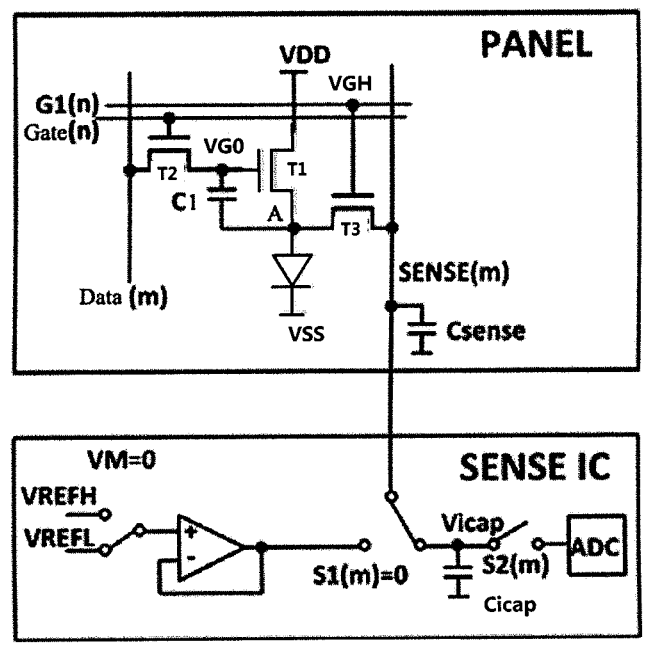
FIG. 5 is a schematic circuit diagram at a holding phase.

After the reset phase, the step enters the second phase, which is a charging phase. In this phase, as shown in FIGS. 2 and 4, a low level signal is input to the gate line Gate, so that the switching transistor T2 is turned off; the third transistor T3 is connected with the voltage holding unit; and the reference voltage VREFL is stopped from being input to the reference voltage terminal. Under such a condition, the power supply voltage terminal VDD charges the storage capacitor C1 and the voltage holding unit.

Moreover, in this embodiment, the power supply voltage terminal VDD inputs a second voltage VDD2 at the charging phase, the second voltage VDD2 is higher than the first voltage VDD1, and the second voltage is a normal working voltage required for generating the driving current.

Since the switching transistor T2 is turned off, when the voltage on the drain of the driving transistor T1 and the second terminal of the storage capacitor C1 is changed from VREFL to VDD2 in the charging phase, the voltage on the first terminal of the storage capacitor C1 is changed to VGM' due to the bootstrap effect.

After the charging phase, the step enters the third phase, which is a holding phase. In this phase, as shown in FIGS.

2 and 5, a high level signal is input to the gate line Gate again, so that the switching transistor T2 is turned on; another specific voltage VG0 is input to the data line Data, so that the driving transistor T1 is turned off; and the first terminal of the storage capacitor C1 has the voltage VG0, and the drain of the driving transistor T1 and the second terminal of the storage capacitor C1 hold the voltage after the charging phase is finished under the action of the voltage holding unit.

The compensation for voltages of the gate and the drain of the driving transistor T1 is completed by the above-mentioned three phases, thus avoiding drift of the threshold voltage $V_{th}$ of the driving transistor T1 and preventing the non-uniformity of the driving transistors T1 and the OLEDs in different pixel units from influencing the display uniformity of pixel units in later light emitting process.

Later, after a transition phase, a light emitting phase is carried out. A driving current is generated according to the voltages of the gate and the drain of the driving transistor T1 and input to the OLED to drive the OLED to emit light, so that the OLED has good brightness uniformity in the light emitting process.

The process of generating the driving current is described in detail above taking the driving module 1 with a simplest 2T1C structure (namely the driving module 1 includes two transistors and a capacitor) as an example. It should be noted that, in practice, the driving module 1 may have other structures, e.g. including more transistors and/or more capacitors.

In the OLED driving compensation circuit provided by the embodiment of the present invention, the external compensation module 2 is used for compensating the voltages of the gate and the drain of the driving transistor T1, to avoid that the threshold voltage of the driving transistor T1, the voltage drop on the power line and the non-uniformity of film thickness in the OLEDs influence the luminance uniformity of each OLED in a frame of picture and the luminance uniformity of the OLEDs. Moreover, at the reset phase of compensation, the first voltage VDD1 input by the power supply voltage terminal VDD is equal to the reference voltage VREFL, so that the voltage on the electrode of the driving transistor T1 connected with the second terminal of the storage capacitor C1 is completely equal to the reference voltage VREFL, and then a best reset effect is achieved. Thus, it is not needed to require the resistance of the third transistor T3 to be further lower than that of the driving transistor T1 in order that the difference between the voltage on the electrode of the driving transistor T1 connected with the second terminal of the storage capacitor C1 and the reference voltage VREFL is as small as possible, so that large width-length ratio of the third transistor T3 can be avoided, and the problems that the aperture ratio of pixel units is reduced and the area occupied by each pixel unit is enlarged are avoided.

An embodiment of the present invention further provides a driving method for the above-mentioned OLED driving compensation circuit. The driving method includes the reset phase, the charging phase and the holding phase in the above-mentioned embodiment, which are not described in detail herein.

When the voltage on the electrode of the driving transistor T1 connected with the second terminal of the storage capacitor C1 is reset, the reference voltage VREFL is input to the electrode of the driving transistor T1 connected with the second terminal of the storage capacitor C1; a first voltage VDD1 is input to the electrode of the driving transistor T1 connected with the power supply voltage terminal VDD; and the first voltage VDD1 is equal to the reference voltage VREFL.

In this embodiment, when the voltages of the control electrode of the driving transistor T1 and the electrode of the driving transistor T1 connected with the second terminal of the storage capacitor C1 are reset, the first voltage VDD1 equal to the reference voltage VREFL is input from the power supply voltage terminal VDD, and the reference voltage VREFL is also input from the reference voltage terminal VREF, so that the voltage on the electrode of the driving transistor T1 connected with the second terminal of the storage capacitor C1 is equal to the reference voltage VREFL, then a best reset effect can be achieved, and a best compensation effect can be achieved. Meanwhile, it is not needed to require the resistance of the third transistor T3 to be further lower than that of the driving transistor T1 in order that the difference between the voltage on the electrode of the driving transistor T1 connected with the second terminal of the storage capacitor C1 and the reference voltage VREFL is as small as possible, so that large width-length ratio of the third transistor T3 can be avoided, and the problems that the aperture ratio of pixel units is reduced and the area occupied by each pixel unit is enlarged are avoided.

After the step of resetting the voltages of the control electrode of the driving transistor T1 and the electrode of the driving transistor T1 connected with the second terminal of the storage capacitor C1 is finished, a second voltage VDD2 is input to the electrode of the driving transistor T1 connected with the power supply voltage terminal VDD, the second voltage VDD2 is higher than the first voltage VDD1. The second voltage VDD2 is a normal working voltage required for generating the driving current.

It could be understood that the above embodiments are merely exemplary embodiments adopted for describing the principle of the present invention, but the present invention is not limited thereto. Various modifications and improvements may be made for those of ordinary skill in the art without departing from the spirit and essence of the present invention, and these modifications and improvements are regarded within the protection scope of the present invention.

The invention claimed is:

1. An OLED driving compensation circuit, comprising a driving module and an external compensation module, wherein the driving module comprises a driving transistor and a storage capacitor, a first electrode of the driving transistor is connected with a power supply voltage terminal, and a second electrode of the driving transistor is connected with an OLED, a first terminal of the storage capacitor is connected with a control electrode of the driving transistor, and a second terminal of the storage capacitor is connected between the second electrode of the driving transistor and the OLED;

the external compensation module is connected with the second electrode of the driving transistor and is connected with the OLED, and is used for providing a reference voltage to the second terminal of the storage capacitor and the second electrode of the driving transistor connected with the second terminal of the storage capacitor, so as to reset the voltage on the second terminal of the storage capacitor and the second electrode of the driving transistor connected with the second terminal of the storage capacitor; and the power supply voltage terminal is a variable voltage source, which inputs a first voltage when the external compensation module resets the voltage on the second terminal of the storage capacitor and the second electrode of the driving transistor connected with the second terminal of the storage capacitor, the first voltage is equal to the reference voltage.

2. The OLED driving compensation circuit of claim 1, wherein the driving module further comprises a switching transistor, a control electrode of the switching transistor is connected with a gate line, a first electrode of the switching transistor is connected with a data line, a second electrode of the switching transistor is connected with the control electrode of the driving transistor and the first terminal of the storage capacitor, and the OLED is further connected with a low voltage terminal.

3. The OLED driving compensation circuit of claim 1, wherein the external compensation module comprises a third transistor and a reference voltage terminal, the control electrode of the third transistor is connected with a control signal terminal, a first electrode of the third transistor is connected between the driving transistor and the OLED, a second electrode of the third transistor is connected with the reference voltage terminal via a switch, and the reference voltage terminal is used for inputting the reference voltage.

4. The OLED driving compensation circuit of claim 3, wherein the external compensation module further comprises a voltage holding unit, the voltage holding unit is connected with the second electrode of the third transistor, and is used for holding the voltage on the second electrode of the driving transistor connected with the second terminal of the storage capacitor.

5. The OLED driving compensation circuit of claim 4, wherein the voltage holding unit comprises at least one holding capacitor, one terminal of the holding capacitor is connected with the second electrode of the third transistor, and the other terminal of the holding capacitor is grounded.

6. The OLED driving compensation circuit of claim 5, wherein the voltage holding unit comprises two holding capacitors.

7. The OLED driving compensation circuit of claim 3, wherein each transistor is an N-type transistor.

8. A driving method for the OLED driving compensation circuit of claim 1, comprising a reset step, for resetting the voltages of the control electrode of the driving transistor and the electrode connected with the second terminal of the storage capacitor, wherein the reset step comprises inputting the reference voltage to the second electrode of the driving transistor connected with the second terminal of the storage capacitor and inputting the first voltage to the electrode of the driving transistor connected with the power supply voltage terminal, the first voltage is equal to the reference voltage.

9. The driving method of claim 8, further comprising:

a charging step, for charging the storage capacitor, wherein the charging step comprises inputting a second voltage to the electrode of the driving transistor connected with the power supply voltage terminal, the second voltage is higher than the first voltage; and a holding step, for holding the voltage on the second terminal of the storage capacitor and the voltage on the second electrode of the driving transistor connected with the second terminal of the storage capacitor.

10. The driving method of claim 9, wherein the driving module further comprises a switching transistor, a control electrode of the switching transistor is connected with a gate line, a first electrode of the switching transistor is connected with a data line, a second electrode of the switching transistor is connected with the control electrode of the driving transistor and the first terminal of the storage capacitor, and the OLED is further connected with a low voltage terminal; and the external compensation module comprises a third transistor, a reference voltage terminal and a voltage holding unit, the control electrode of the third transistor is connected with a control signal terminal, a first electrode of the third transistor is connected between the driving transistor and the OLED, a second electrode of the third transistor is connected with the reference voltage terminal via a switch, and the reference voltage terminal is used for inputting the reference voltage, and the voltage holding unit is connected with the second electrode of the third transistor, and is used for holding the voltage on the second electrode of the driving transistor connected with the second terminal of the storage capacitor.

11. The driving method of claim 10, wherein in the reset step, a high level signal is input to the gate line and the control signal terminal, and a first data signal is input to the data line, so that the driving transistor is turned on.

12. The driving method of claim 11, wherein in the charging step, a low level signal is input to the gate line, a high level signal is input to the control signal terminal, the reference voltage is stopped from being input to the reference voltage terminal, and the power supply voltage terminal charges the storage capacitor and the voltage holding unit, the second voltage is a normal working voltage required for generating the driving current.

13. The driving method of claim 12, wherein in the holding step, a high level signal is input to the gate line and the control signal terminal, a specific voltage is input to the data line, and the driving transistor is turned off by the specific voltage, so that the first terminal of the storage capacitor has the specific voltage, and the second terminal of the storage capacitor holds the voltage charged in the charging step under the action of the voltage holding unit.

* * * * *